US008798633B2

(12) United States Patent
Sergeyev et al.

(10) Patent No.: US 8,798,633 B2
(45) Date of Patent: Aug. 5, 2014

(54) POSITIONING-ASSISTED CELL SELECTION AND HANDOVER FOR LTE

(75) Inventors: Vadim Sergeyev, Nizhny Novgorod (RU); Alexander Maltsev, Nizhny Novgorod (RU); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 7 days.

(21) Appl. No.: 13/591,744

(22) Filed: Aug. 22, 2012

(65) Prior Publication Data

US 2014/0057635 A1 Feb. 27, 2014

(51) Int. Cl.
*H04W 36/32* (2009.01)
(52) U.S. Cl.
USPC .......................................... 455/440; 455/438
(58) Field of Classification Search
CPC ....... H04W 4/02; H04W 36/32; H04W 64/00; H04W 64/003; H04W 84/18
USPC .................. 455/436, 438, 456.1, 456.3, 440; 370/236, 254, 329
See application file for complete search history.

(56) References Cited

U.S. PATENT DOCUMENTS

| 2004/0185870 | A1 | 9/2004 | Matsuda |
| 2008/0144552 | A1* | 6/2008 | Johansson et al. ............ 370/310 |
| 2012/0165040 | A1 | 6/2012 | Lee et al. |
| 2012/0188938 | A1 | 7/2012 | Venkatraman et al. |

FOREIGN PATENT DOCUMENTS

WO 2014/031215 A1 2/2014

OTHER PUBLICATIONS

International Search Report and Written Opinion received for PCT Application No. PCT/US2013/045880, mailed on Jul. 31, 2013, 9 Pages.

* cited by examiner

*Primary Examiner* — Sam Bhattacharya
(74) *Attorney, Agent, or Firm* — Cool Patent P.C.

(57) ABSTRACT

A cell-selection and a cell re-selection process include a wireless device that receives a signal from at least one node of a wireless network. The received signal can be a reference signal, an uplink signal, or a downlink signal, or a combination thereof. Location information of the wireless device is determined based on the received signal and transmitted to the wireless network. Information is received from the wireless network that contains a list of candidate nodes to which the wireless device can connect to the wireless network. The list of candidate nodes comprises a list of macro cell nodes, low-power cell nodes, or a combination thereof. The wireless device searches through the information containing the list of candidate nodes to determine a node for a connection to the wireless network.

26 Claims, 11 Drawing Sheets

US 8,798,633 B2

POSITIONING-ASSISTED CELL SELECTION AND HANDOVER FOR LTE

TECHNICAL FIELD

Embodiments described herein are generally directed to the field of wireless communications.

BACKGROUND

A conventional cell-selection process for a wireless device (WD), such as, but not limited to, a mobile station (MS), a User Equipment (UE), machine-to-machine (M2M) device, or customer premises equipment (CPE), in a Third Generation Partnership Project Long Term Evolution (3GPP LTE) based communications network involves the wireless device to identify a suitable cell in the network to connect to, or camp on. Such a conventional cell-selection process is a time- and power-consuming procedure. From the physical layer (PHY) standpoint, a suitable cell provides an optimal or a nearly optimal received signal quality, such as a maximum Received Signal Strength (RSS) or a maximum Signal to Interference and Noise Ratio (SINR). To find a suitable cell for connecting to, a wireless device attempts to decode the reference signals of nearby cells using all possible Cell ID values, which may include as many as several hundreds of Cell ID values. Accordingly, the process of evaluating all possible Cell ID values consumes substantial amount of time and power resources of the wireless device.

Moreover, cell selection is not a one-time process. That is, network entry for a wireless device in an LTE-based network includes initial cell selection and regular cell re-selection attempts. During initial cell selection, the wireless device searches for a suitable cell to initially connect to the network. The wireless device then performs regular cell re-selection attempts to determine if there is a cell having better receiving conditions than the cell to which the wireless device is currently connected. During each cell re-selection attempt, the wireless device performs a full search over all possible Cell ID values. The same process occurs for each handover event in which a new target cell is selected. The cell re-selection occurs more often with increasing wireless device mobility and with increasing numbers lower-power nodes deployments, such as pico-cells, femto-cells, etc., in which a typical cell size is relatively smaller than the size of a macro cell.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

Figure 1A:
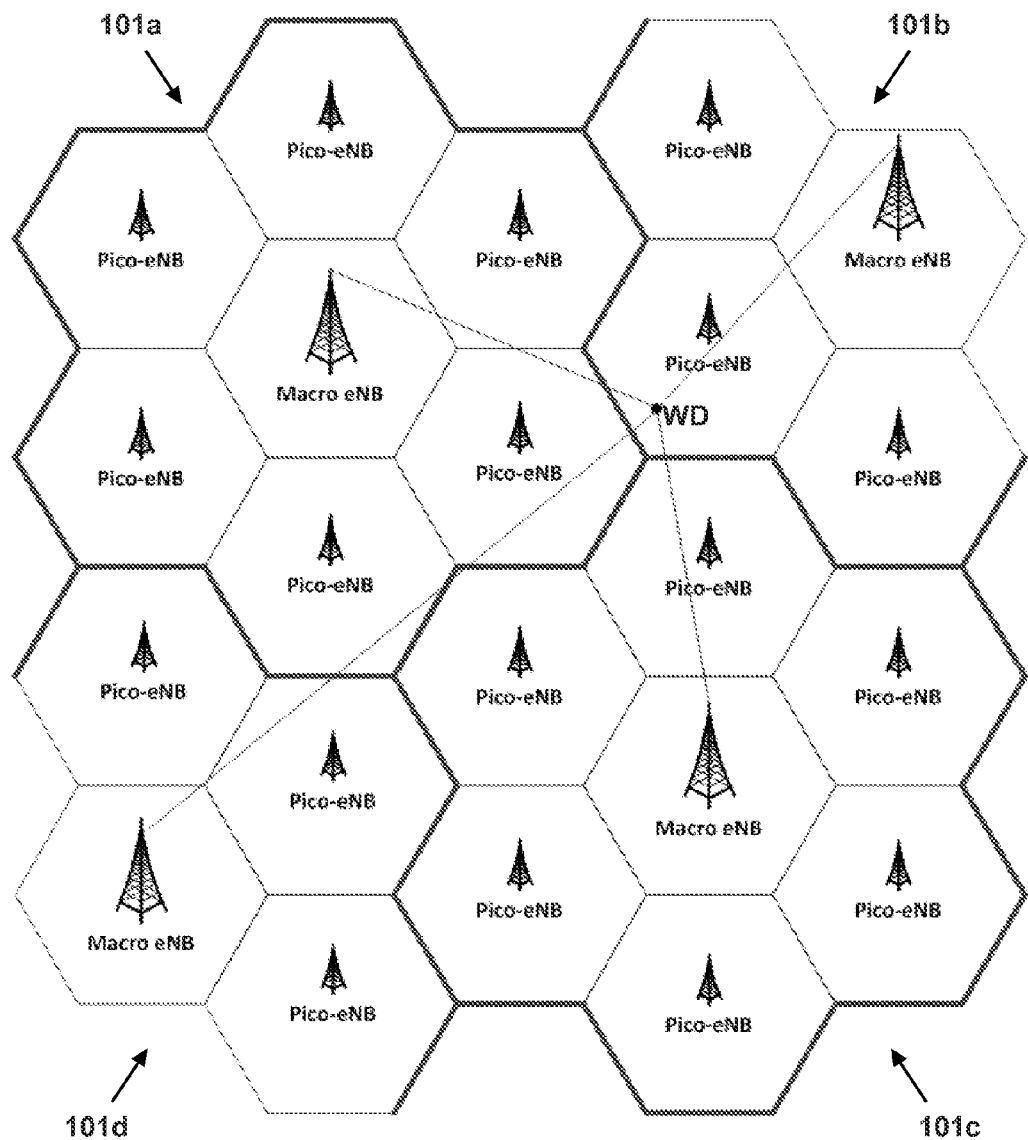
FIGS. 1A and 1B respectively depict two exemplary reference node configurations that participate in a position-determination aspect of a positioning-assisted cell-selection technique according to the subject matter disclosed herein.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of described herein relate to a system and a method for providing a positioning-assisted cell-selection technique cell-selection technique. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein provides a positioning-assisted cell-selection technique and handover technique (generally referred to herein as a positioning-assisted cell-selection technique) that makes a wireless device aware of surrounding cells of a communication network to which the wireless device could potentially connect, or camp on, as opposed to identifying all possible surrounding cells including cells to which the wireless device could not connect. The subject matter disclosed herein substantially reduces the computational intensity for a wireless device performing cell re-selection and/or handover, thereby significantly reducing power consumption of the wireless device and corresponding delays, and providing a longer battery life and an improved user experience.

According to the subject matter disclosed herein, cell selection is assisted by the network with the help of a positioning procedure that is used to determine the location of a wireless device and create a list of candidate nodes that the wireless device uses for determining a suitable cell for cell selection. Accordingly, the list of candidate nodes may be as much as one hundred times smaller than the list of all possible Cell ID values that would be conventionally searched if the wireless device were not assisted by the network. The list of candidate nodes can include nodes such as, but not limited to, base stations (BSs), evolved NodeB (eNB or eNodeB), and/or Remote Radio Heads (RRHs) for macro-cell, pico-cells, and/or femto-cells, In one exemplary embodiment, the positioning-assisted cell-selection technique is activated immediately after the wireless device establishes an initial connection to the network. In another exemplary embodiment, a positioning-assisted cell-selection technique is selectively activated at a later time after initial connection to the network either by a decision made at the wireless device and/or at a network entity.

Figure 1B:
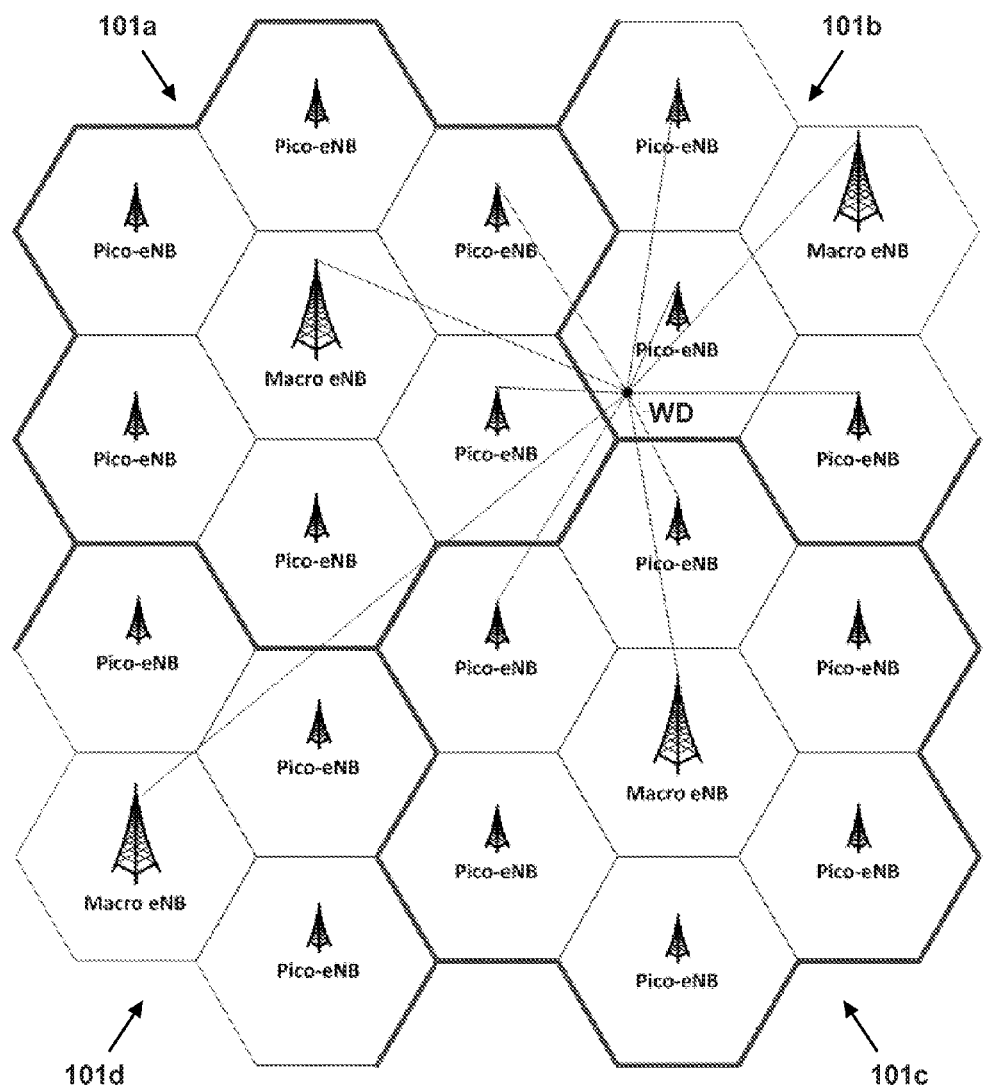

The positioning-assisted cell-selection technique of the subject matter disclosed herein may use location-determining techniques of various complexity and involving different sets of reference nodes for determining the position, or location, of a wireless device within a network. FIGS. 1A and 1B respectively depict two exemplary reference node configurations that may participate in a positioning-assisted cell-selection technique according to the subject matter disclosed herein. In particular, FIG. 1A depicts an exemplary reference node configuration utilizing only macro nodes, such as base stations (BSs) or evolved NodeBs (eNBs) for determining a position of a wireless device (WD) in a network. FIG. 1B, in contrast to FIG. 1A, depicts an exemplary reference node configuration utilizing both macro and lower-power nodes, such as, but not limited to, pico-cells for determining a position of a wireless device (WD) in a network. The list of candidate nodes provided to the wireless device based on the determined position of the wireless device does not necessarily include the same nodes that were utilized as the reference nodes. In one exemplary embodiment, the list of candidate nodes does not include nodes to which the wireless device cannot connect, but may be in the vicinity of the wireless device.

Both FIGS. 1A and 1B depict an exemplary configuration of reference macro nodes 101*a-d* that each includes an eNB 102*a-d* (macro eNB). The boundaries of macro nodes 101*a-d* are indicated by a heavy solid line separating the macro nodes. Only a portion of macro nodes 101*b* and 101*d* are depicted. Also as depicted, each macro node includes several pico-cells that each includes a pico-eNB. In FIG. 1A, only macro nodes participate as reference nodes in the positioning-assisted cell-selection technique for wireless device (WD). In FIG. 1B, both macro and lower-power nodes participate as reference nodes in the positioning-determination aspect of the positioning-assisted cell-selection technique. The difference between FIG. 1A and FIG. 1B is with respect to the particular reference nodes used for determining the location of the wireless device. In yet other exemplary reference node configurations, any combination of reference macro, pico, and/or femto cells can participate in the positioning-determination aspect of the positioning-assisted cell-selection technique.

Figure 2:
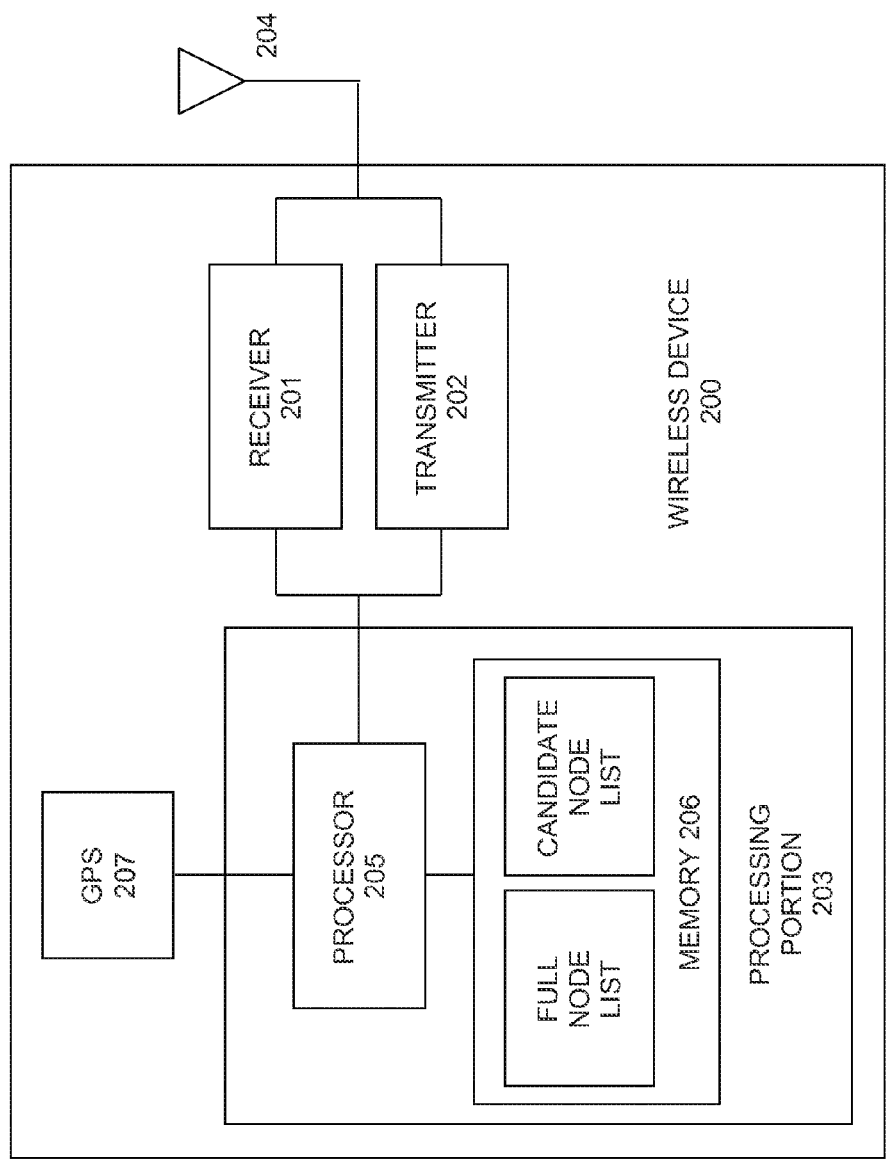
FIG. 2 depicts an exemplary embodiment of a functional block diagram of a wireless device according to the subject matter disclosed herein.

FIG. 2 depicts an exemplary embodiment of a functional block diagram of a wireless device 200 according to the subject matter disclosed herein. Wireless device includes a receiver portion 201, a transmitter portion 202, and a processing portion 203. Receiver portion 201 and transmitter portion 202 are coupled in a well-known manner to processing portion 203 and to one or more antennas 204. Processing portion 203 includes a processor device 205 and a memory 206 that can store a full list of nodes (possible Cell ID values) and a list of candidate nodes. Alternatively, processing portion 203 can generate a full list of nodes in a well-known manner. In one exemplary embodiment, wireless device 200 includes GPS functionality 207. Processing portion 203 can be configured as described in connection with any of subscriber station (SS) 416 (see FIG. 4), customer-premises equipment (CPE) 422 (see FIG. 4), a UE 511 (see FIG. 5), and/or an information-handling system 800 (see FIGS. 8 and 9).

According to the subject matter disclosed herein, one or more positioning-assisted cell-selection techniques could be used for determining the location of a wireless device within a network. In one exemplary embodiment, the location of a wireless device could be determined using a GPS system that is associated with the wireless device, for example, if the wireless device is a smart-type device, such as, but not limited to, a smartphones, a pad-type device, an ultrabook, a subscriber station (SS) 416 (see FIG. 4), customer-premises equipment (CPE) 422 (see FIG. 4), a UE 511 (see FIG. 5), and/or an information-handling system 800 (see FIGS. 8 and 9). The wireless device may send its GPS-determined location information to the eNB of the cell (macro or otherwise) to which it is connected in order to receive a list of candidate nodes surrounding the wireless device that could be used by the wireless device for selecting a suitable cell for the wireless device for a cell-selection or a handover process. For this example, a configuration of a single reference node would be used for assisting the wireless device determine its position, or location, in the network. That is, the wireless device uploads GPS-position information through the single reference node (macro or otherwise). The list of candidate nodes provided to the wireless device may not necessarily include the reference node through which the wireless device sent its GPS-determined location information. In one exemplary embodiment, the list of candidate nodes does not include nodes to which the wireless device cannot connect, although they may be in the vicinity of the wireless device.

In another exemplary embodiment, a wireless device acquires information about its position in a network by information contained in uplink and/or downlink signals of the surrounding network. A positioning-assisted cell-selection technique provides a less computational burden for a wireless device because the wireless device sends only sounding reference signals, which are used by a network entity to determine the location of the wireless device and so a list of candidate nodes can be generated. While positioning-assisted cell-selection using downlink signals generally provides a more accurate position determination than a positioning-assisted cell-selection using uplink signal, positioning-assisted cell-selection using downlink signals imposes a greater computational burden on a wireless device and may result in a fewer number of candidate nodes than a positioning-assisted cell-selection technique that uses uplink signals. Regardless whether position determination is based on uplink or downlink signals, the candidate nodes may be determined as those nodes within the certain distance from the node currently serving the wireless device. Alternatively, the candidate nodes may be determined as those nodes within a certain distance from the determined location of the wireless device. In one exemplary embodiment, the list of candidate nodes does not include nodes to which the wireless device cannot connect, but may be in the vicinity of the wireless device. While either of these two exemplary positioning-assisted cell-selection techniques may result in a relatively large candidate node set, a wireless device will still be able to save computational resources, and reduce cell selection and handover delays in comparison to conventional cell-selection techniques.

Figure 3A:
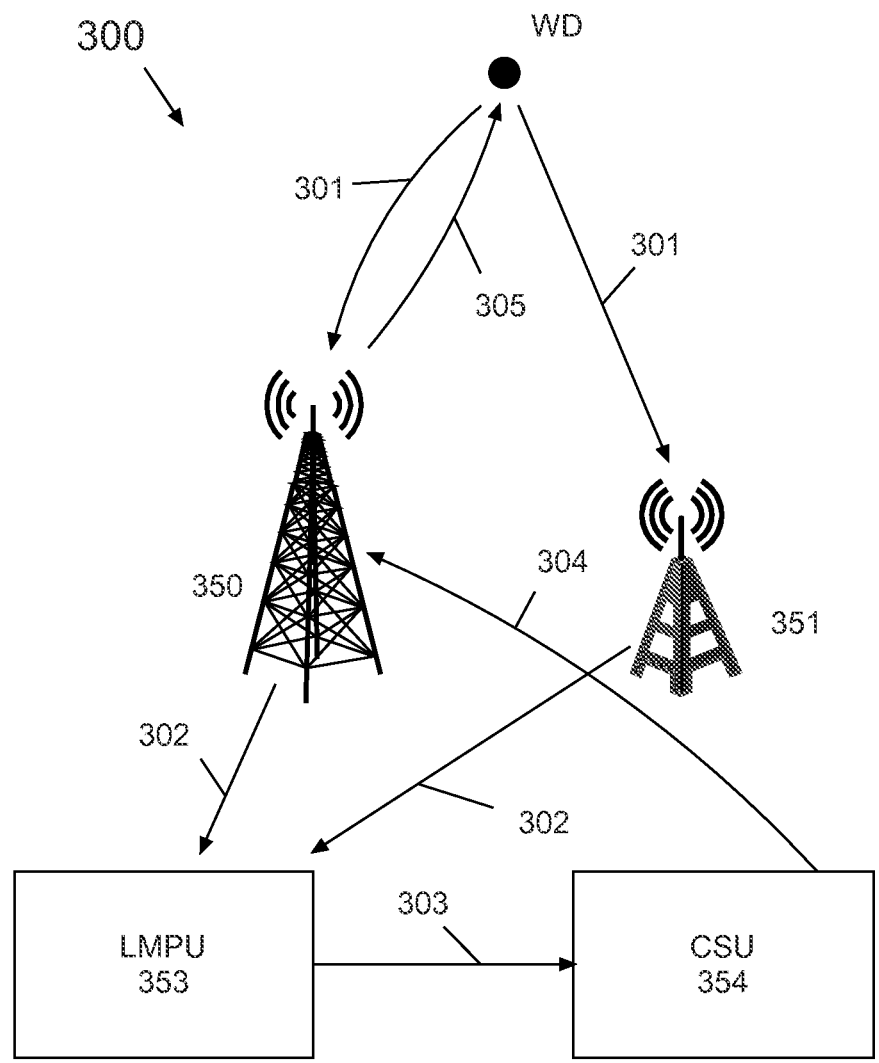
FIGS. 3A and 3B respectively depict exemplary signal flow diagrams illustrating a positioning-assisted cell-selection technique implemented in an uplink and a downlink according to the subject matter disclosed herein.
Figure 3B:
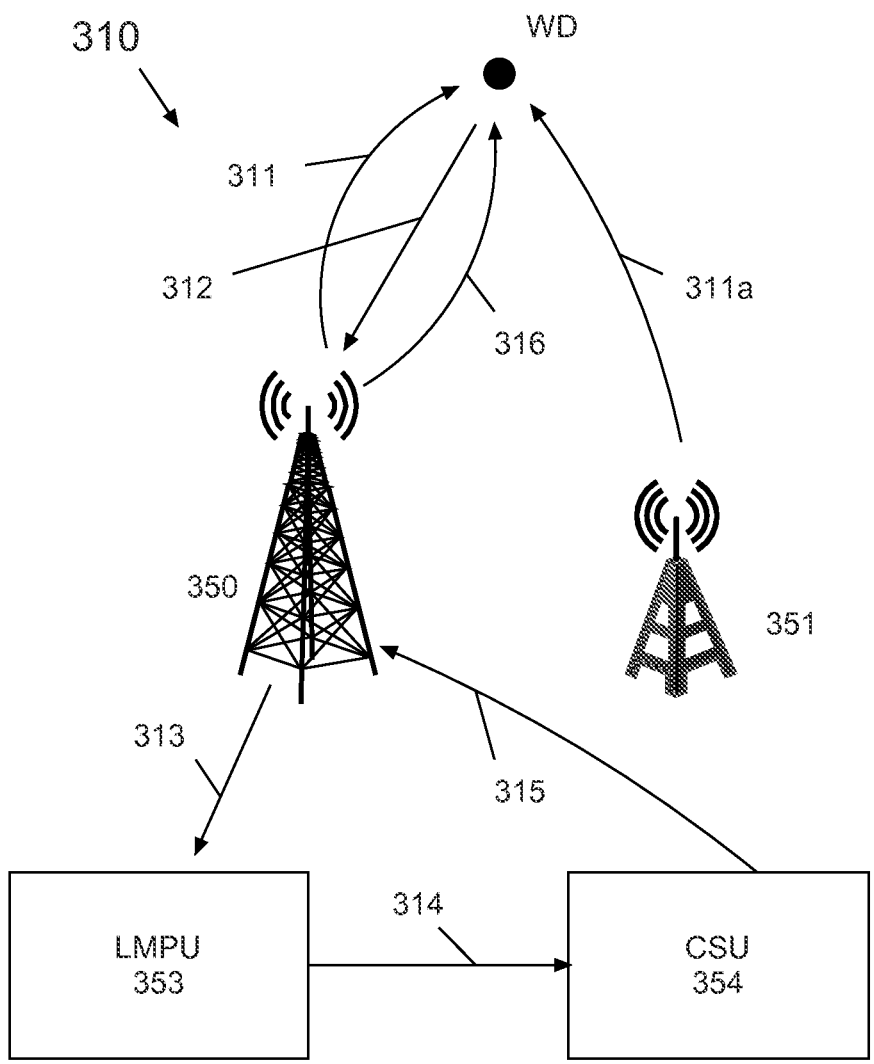

FIGS. 3A and 3B respectively depict exemplary signal flow diagrams 300 and 310 illustrating positioning-assisted cell-selection techniques implemented in an uplink and a downlink according to the subject matter disclosed herein. In FIG. 3A, wireless device WD sends sounding reference signals at 301 that are received by infrastructure nodes, such as a macro eNB 350, a pico eNB 351, an RRH (not indicated) and/or other types of infrastructure nodes. At 302, information obtained from the received sounding reference signals is sent to a network Location Measurement and Prediction Unit (LMPU) 353 that determines the position coordinates, or location coordinates, of the wireless device. In one exemplary embodiment LMPU 353, or the functionality provided by LMPU 353, is located in an Enhanced Serving Mobile Location Center (E-SMLC) or in a Secure User Plane Location Platform. In another exemplary embodiment, LMPU 353, or the functionality provided by LMPU 353, is located in another entity that is part of the network. In one exemplary embodiment that corresponds to the exemplary node configuration of FIG. 1A, the information obtained from the received sounding reference signals is sent to LMPU 353 from only macro cell nodes. In another exemplary embodiment that corresponds to the exemplary node configuration of FIG. 1B, the information obtained from the received sounding reference signals is sent to LMPU 353 from a combination of macro cell nodes and lower-power nodes. At 303, LMPU 353 sends the <coordinates determined for the wireless device to a Cell Selection Unit (CSU) 354. In one exemplary embodiment. CSU 354 can be co-located with LMPU 353. In another exemplary embodiment, CSU 354 can be located remotely from LMPU 353. Based on the determined position coordinates for the wireless device and, for example, but not limited to, the known physical locations of the infrastructure nodes with which the wireless device communicated, CSU 354 determines a set of candidate nodes for the wireless device to evaluate. In one exemplary embodiment, CSU 354 determines the set of candidate nodes by comparing the distance between the wireless device and a node with the size of a coverage area of the node and determining if the coverage area is overlapping the wireless device. At 304, CSU 354 sends the candidate list to the eNB to which the wireless device is connected (in this example, eNB 350), and at 305, the eNB uses, for example, a well-known PHY-layer control signaling technique and/or a well-known higher-layer signaling technique to communicate the list of candidate nodes to the wireless device. In one exemplary embodiment, the list of candidate nodes does not include nodes to which the wireless device cannot connect, even though they may be in the vicinity of the wireless device. The wireless device uses the received list of candidate nodes, which includes, but is not limited to, candidate macro cells, pico cells, femto cells and RRHs, to determine a suitable cell for selection. If the cell search over the list of candidate nodes is unsuccessful, the wireless device may continue searching over other possible Cell ID values.

At 311 in FIG. 3B, wireless device WD receives reference, control, and data signals from an infrastructure node to which wireless device WD is connected, such as macro eNB 350. Wireless device WD determines position-related information from the exchanged control and data signals. Wireless device WD can also obtain additional position-related information from reference, control, and data signals 311a that are transmitted from other infrastructure nodes, such as, but not limited to a pico eNB 351, an RRH (not indicated) and/or other types of infrastructure nodes. At 312, wireless device WD sends the position-related information 30 determined by the wireless device to eNB 351. At 313, the position-related information from wireless device WD is sent to a network Location Measurement and Prediction Unit (LMPU) 353 that determines the position, or location, coordinates of the wireless device. In one exemplary embodiment LMPU 353, or the functionality provided by LMPU 353, is located in an E-SMLC or in a Secure User Plane Location Platform. In another exemplary embodiment, LMPU 353, or the functionality provided by LMPU 353, is located in another entity that is part of the network. At 314, LMPU 353 sends the coordinates determined for the wireless device to a Cell Selection Unit (CSU) 354. In one exemplary embodiment, CSU 354 can be co-located with LMPU 353. In another exemplary embodiment, CSU 354 can be located remotely from LMPU 353. At 315, CSU 354 sends the candidate list to the node to which the wireless device is connected (for this example, eNB 350), and at 316, the node uses, for example, a well-known PHY-layer control signaling technique and/or a well-known higher-layer signaling technique to communicate the list of candidate nodes to the wireless device. In one exemplary embodiment, the list of candidate nodes does not include nodes to which the wireless device cannot connect, although they may be in the vicinity of the wireless device. The wireless device uses the received list of candidate nodes, which includes, but is not limited to, candidate macro cells, pico cells, femto cells and RRHs, to determine a suitable cell for selection. If the cell search over the list of candidate nodes is unsuccessful, the wireless device may continue searching over other possible Cell ID values.

For high-mobility wireless devices that may substantially change location during a typical handover interval, LMPU 353 is capable of predicting the location of a wireless device and is able to send the predicted location to CSU 354. In one exemplary embodiment, the predicted location of a wireless device is based on tracking of series of determined locations, a determined average speed, and the direction of travel of the wireless device. CSU 354 then, based on the predicted location of the wireless device, determines a set of candidate nodes for wireless device that, in one exemplary embodiment, does not include nodes to which the wireless device cannot connect, but may be in the vicinity of the wireless device. In another exemplary embodiment, the predicted location information can further be based on other known information, such as, but not limited to, street maps, and known shadowing factors corresponding to the location of the wireless device.

Figure 4:
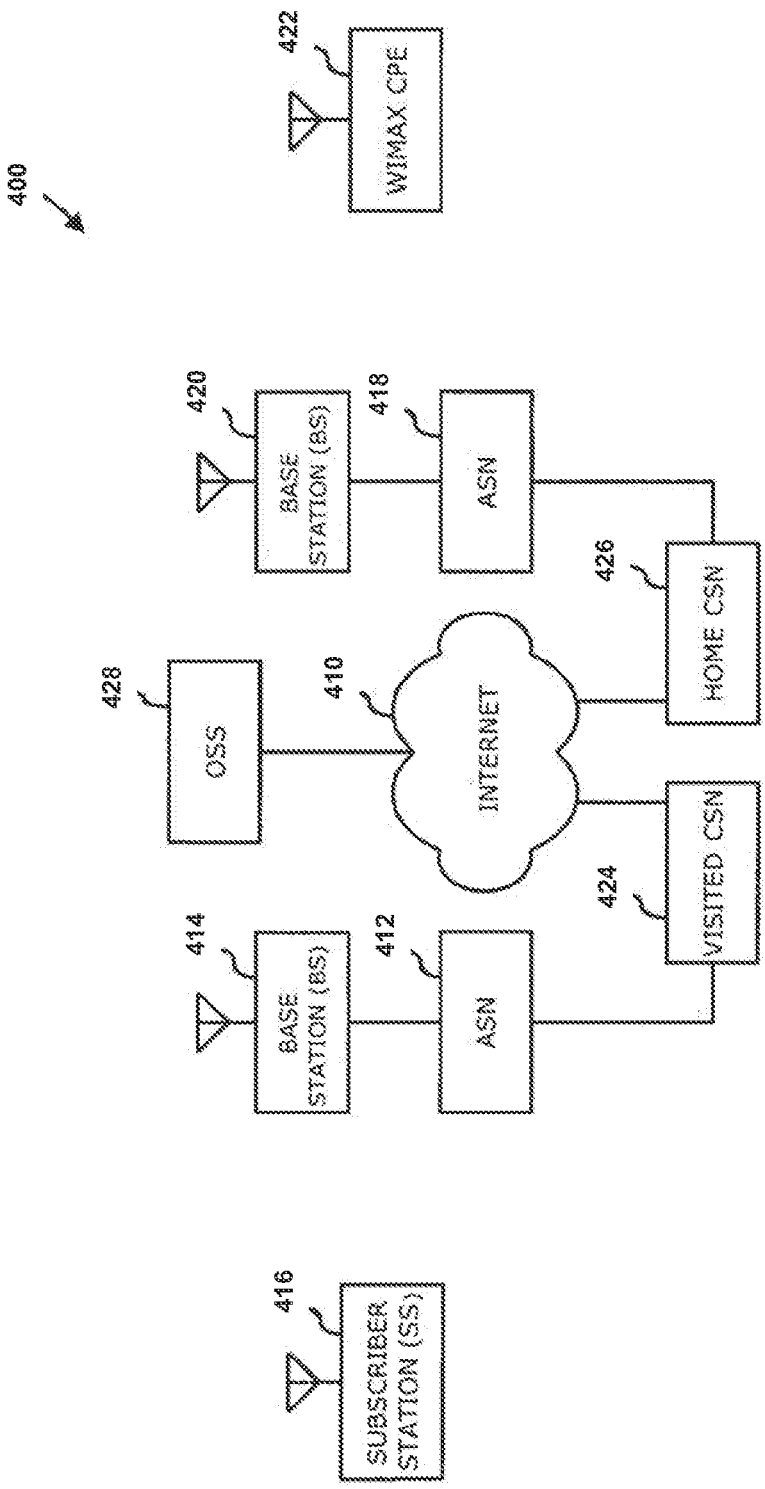
FIG. 4 depicts a block diagram of an exemplary configuration of a wireless network in accordance with one or more exemplary embodiments disclosed herein.

FIG. 4 depicts a block diagram of an exemplary configuration of a wireless network 400 in accordance with one or more exemplary embodiments disclosed herein. One or more of the elements of wireless network 400 may be capable of providing a positioning-assisted cell-selection technique according to the subject matter disclosed herein. As shown in FIG. 4, network 400 may be an Internet-Protocol-type (IP-type) network comprising an Internet-type network 410, or the like, that is capable of supporting mobile wireless access and/or fixed wireless access to Internet 410. In one or more exemplary embodiments, network 400 may be in compliance with a Worldwide Interoperability for Microwave Access (WiMAX) standard or future generations of WiMAX, and in one particular embodiment may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative exemplary embodiments, network 300 may be in compliance with a Third Generation Partnership Project Long Term Evolution (3GPP LTE), a 3GPP2 Air Interface Evolution (3GPP2 AIE) standard and/or a 3GPP LTE-Advanced standard. In general, network 400 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects. As an example of mobile wireless access, access service network (ASN) 412 is capable of coupling with base station (BS) 414 to provide wireless communication between subscriber station (SS) 416 (also referred to herein as a wireless terminal) and Internet 410. In one exemplary embodiment, subscriber station 416 may comprise a mobile-type device or information-handling system capable of wirelessly communicating via network 400, for example, a notebook-type computer, a cellular telephone, a personal digital assistant, an M2M-type device, or the like. In another exemplary embodiment, subscriber station is capable of providing a positioning-assisted cell-selection technique according to the subject matter disclosed herein. ASN 412 may implement profiles that are capable of defining the mapping of network functions to one or more physical entities on network 400. Base station 414 may comprise radio equipment to provide radio-frequency (RF) communication with subscriber station 416, and may comprise, for example, the physical layer (PHY) and media access control (MAC) layer equipment in compliance with an IEEE 802.16e-type standard. Base station 414 may further comprise an IP backplane to couple to Internet 410 via ASN 412, although the scope of the claimed subject matter is not limited in these respects.

Network 400 may further comprise a visited connectivity service network (CSN) 424 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 426, and the scope of the claimed subject matter is not limited in these respects. Visited CSN 424 may be referred to as a visited CSN in the case, for example, in which visited CSN 424 is not part of the regular service provider of subscriber station 416, for example, in which subscriber station 416 is roaming away from its home CSN, such as home CSN 426, or, for example, in which network 400 is part of the regular service provider of subscriber station, but in which network 400 may be in another location or state that is not the main or home location of subscriber station 416. In a fixed wireless arrangement, WiMAX-type customer premises equipment (CPE) 422 may be located in a home or business to provide home or business customer broadband access to Internet 410 via base station 420, ASN 418, and home CSN 426 in a manner similar to access by subscriber station 416 via base station 414, ASN 412, and visited CSN 424, a difference being that WiMAX CPE 422 is generally disposed in a stationary location, although it may be moved to different locations as needed, whereas subscriber station may be utilized at one or more locations if subscriber station 416 is within range of base station 414 for example. It should be noted that CPE 422 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 422 is capable of providing a positioning-assisted cell-selection technique according to the subject matter disclosed herein. In accordance with one or more embodiments, operation support system (OSS) 428 may be part of network 400 to provide management functions for network 400 and to provide interfaces between functional entities of network 400. Network 400 of FIG. 4 is merely one type of wireless network showing a certain number of the components of network 400; however, the scope of the claimed subject matter is not limited in these respects.

Figure 5:
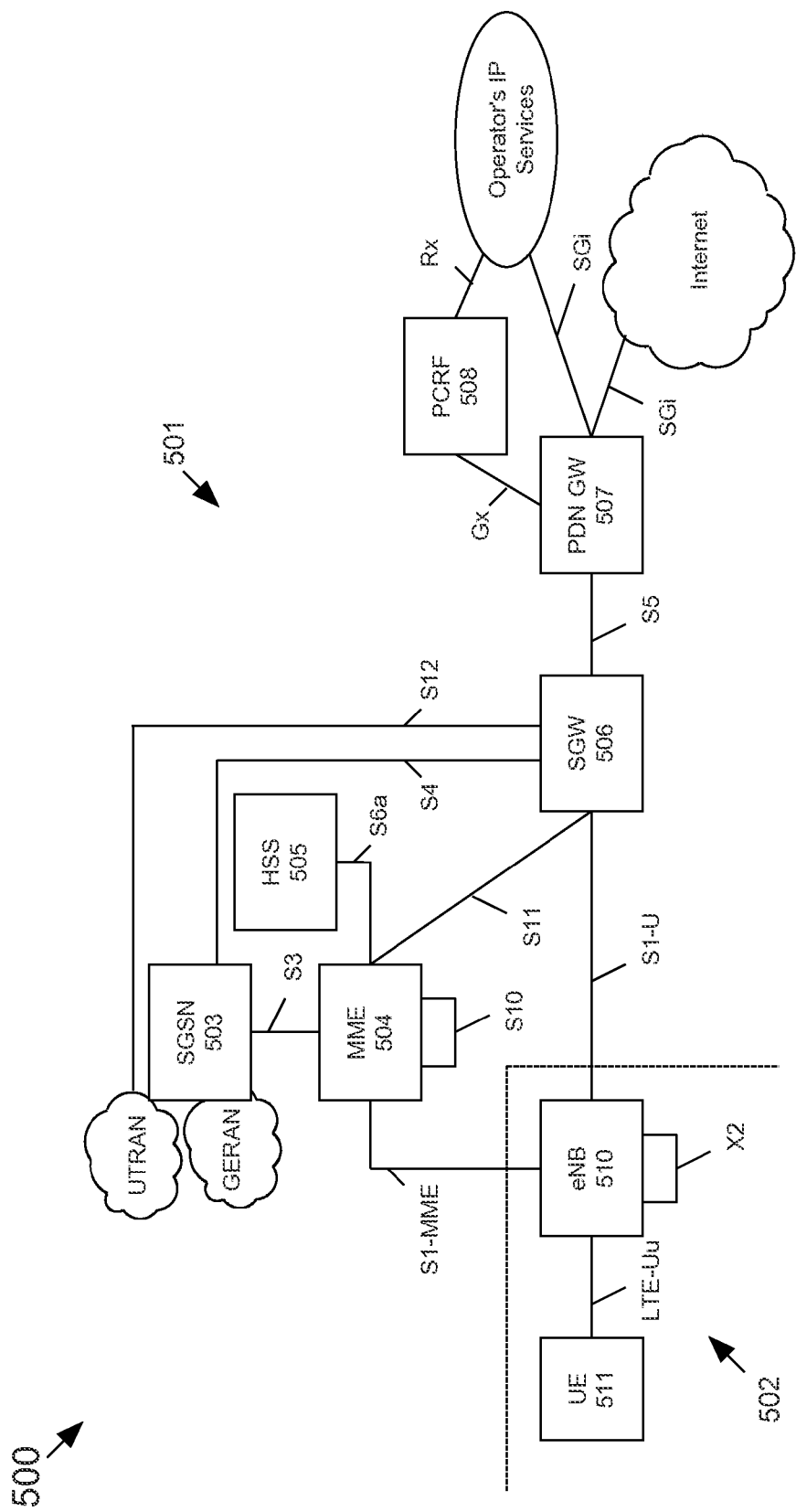
FIG. 5 shows an exemplary block diagram of the overall architecture of a 3GPP LTE network that includes one or more devices that are capable of providing a positioning-assisted cell-selection technique according to the subject matter disclosed herein.

FIG. 5 shows an exemplary block diagram of the overall architecture of a 3GPP LTE network 500 that includes one or more devices that are capable of providing a positioning-assisted cell-selection technique according to the subject matter disclosed herein. FIG. 5 also generally shows exemplary network elements and exemplary standardized interfaces. At a high level, network 500 comprises a core network (CN) 501 (also referred to as an evolved Packet System (EPC)), and an air-interface access network E-UTRAN 502. CN 501 is responsible for the overall control of the various User Equipment (UE) connected to the network and establishment of the bearers. CN 501 may include functional entities, such as a home agent HA and/or an ANDSF server or entity, although not explicitly depicted. E-UTRAN 502 is responsible for all radio-related functions.

The main exemplary logical nodes of CN 501 include, but are not limited to, a Serving GPRS Support Node 503, the Mobility Management Entity 504, a Home Subscriber Server (HSS) 505, a Serving Gate (SGW) 506, a PDN Gateway 507 and a Policy and Charging Rules Function (PCRF) Manager 508. The functionality of each of the network elements of CN 501 is well known and is not described herein. Each of the network elements of CN 501 are interconnected by well-known exemplary standardized interfaces, some of which are indicated in FIG. 5, such as interfaces S3, S4, S5, etc. although not described herein.

While CN 501 includes many logical nodes, the E-UTRAN access network 502 is formed by at least one node, such as evolved NodeB (base station (BS), eNB or eNodeB) 510, which connects to one or more User Equipment (UE) 511, of which only one is depicted in FIG. 5. UE 511 is also referred to herein as a wireless device (WD) and/or a subscriber station (SS), and can include an M2M-type device. In one exemplary embodiment, UE 511 is capable of providing a positioning-assisted cell-selection technique according to the subject matter disclosed herein. In one exemplary configuration, a single cell of an E-UTRAN access network to 502 provides one substantially localized geographical transmission point (having multiple antenna devices) that provides access to one or more UEs. In another exemplary configuration, a single cell of an E-UTRAN access network 502 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an SI interface. More specifically, an eNB is connected to MME 504 by an SI-MME interface and to SGW 506 by an SI-U interface. The protocols that run between the eNBs and the UEs are generally referred to as the "AS protocols." Details of the various interfaces are well known and not described herein.

The eNB 510 hosts the PHYsical (PHY), Medium Access Control (MAC), Radio Link Control (RLC), and Packet Data Control Protocol (PDCP) layers, which are not shown in FIG. 5, and which include the functionality of user-plane header-compression and encryption. The eNB 510 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 510 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 511, generates pages for UEs 511 over the air, broadcasts system information, controls UE measurement reporting, such as the periodicity of Channel Quality Information (CQI) reports, and allocates cell-level temporary identifiers to active UEs 511. The RRC layer also executes transfer of UE context from a source eNB to a target eNB during handover, and provides integrity protection for RRC messages. Additionally, the RRC layer is responsible for the setting up and maintenance of radio bearers.

Figure 6:
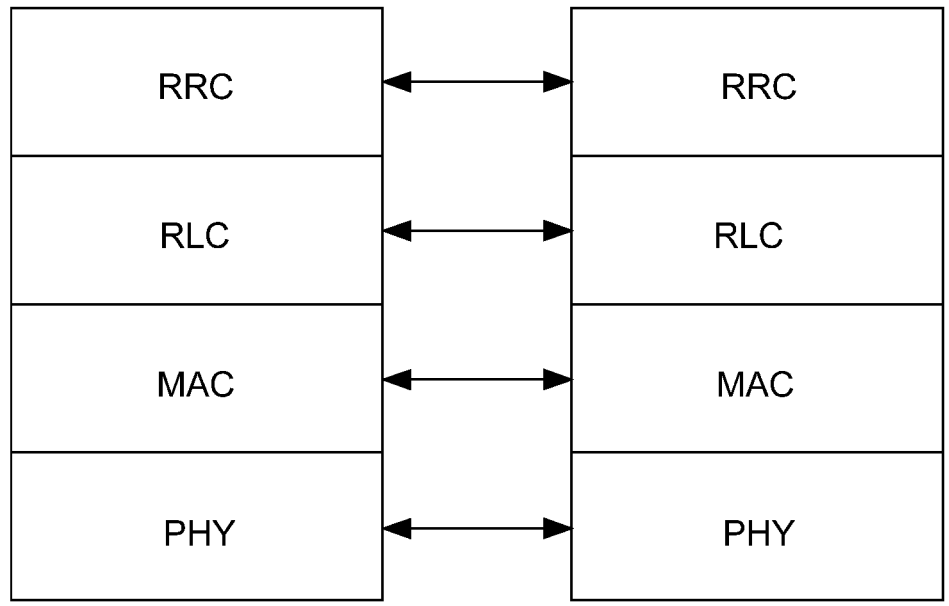
FIGS. 6 and 7 respectively depict exemplary radio interface protocol structures between a UE and an eNodeB that are based on a 3GPP-type radio access network standard and that is capable of providing a positioning-assisted cell-selection technique according to the subject matter disclosed herein.
Figure 7:
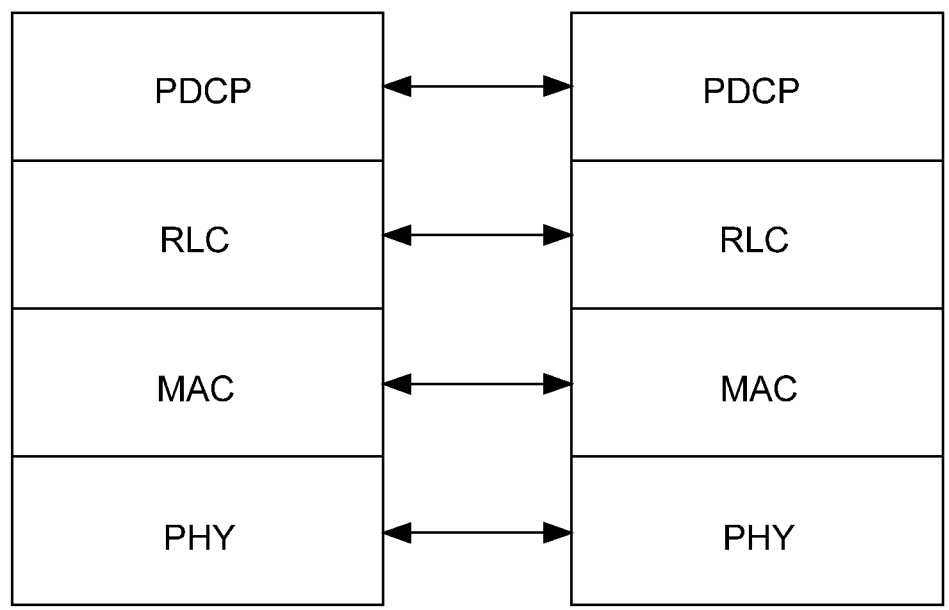

FIGS. 6 and 7 respectively depict exemplary radio interface protocol structures between a UE and an eNodeB that are based on a 3GPP-type radio access network standard and that is capable of providing a positioning-assisted cell-selection technique according to the subject matter disclosed herein. More specifically, FIG. 6 depicts individual layers of a radio protocol control plane and FIG. 7 depicts individual layers of a radio protocol user plane. The protocol layers of FIGS. 6 and 7 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 8:
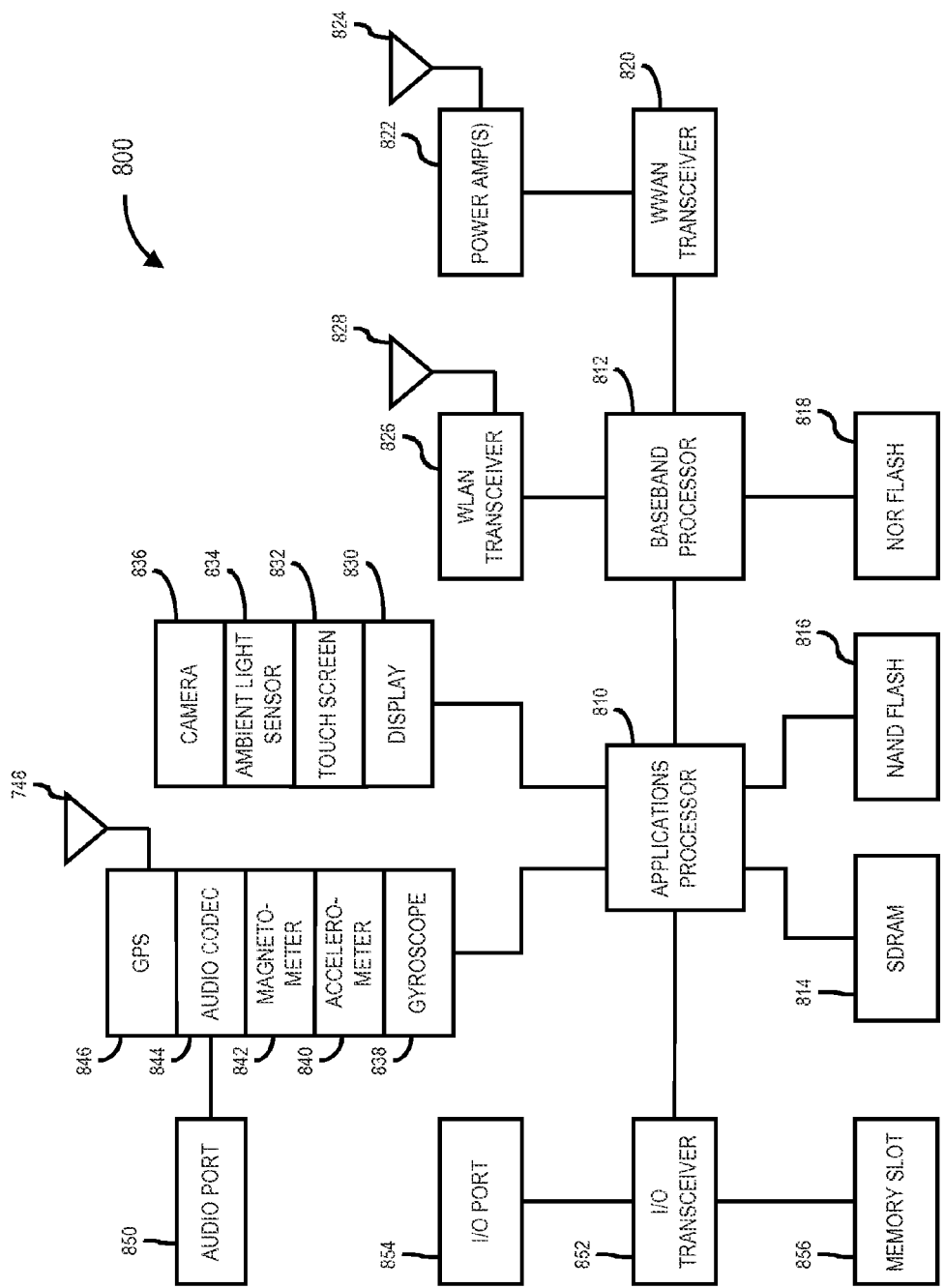
FIG. 8 depicts an exemplary functional block diagram of an information-handling system that is capable of providing a positioning-assisted cell-selection technique according to the subject matter disclosed herein.

FIG. 8 depicts an exemplary functional block diagram of an information-handling system 800 that is capable of providing a positioning-assisted cell-selection technique according to the subject matter disclosed herein. Information-handling system 800 of FIG. 8 may tangibly embody one or more of any of the exemplary devices, exemplary network elements and/or functional entities of the network as shown in and described with respect to FIG. 2, FIG. 4, and/or core network 501 as shown in and described with respect to FIG. 5. In one exemplary embodiment, information-handling system 800 may represent the components of wireless device 200, subscriber station 416, CPE 422, base stations 414 and 420, eNB 510, and/or UE 511, with greater or fewer components depending on the hardware specifications of the particular device or network element. In another exemplary embodiment, information-handling system may provide M2M-type device capability. In yet another exemplary embodiment, information-handling system 800 is capable of providing a positioning-assisted cell-selection technique according to the subject matter disclosed herein. Although information-handling system 800 represents one example of several types of computing platforms, information-handling system 800 may include more or fewer elements and/or different arrangements of elements than shown in FIG. 8, and the scope of the claimed subject matter is not limited in these respects.

In one or more embodiments, information-handling system 800 may comprise one or more applications processor 810 and a baseband processor 812. Applications processor 810 may be utilized as a general purpose processor to run applications and the various subsystems for information handling system 800, and to capable of providing a positioning-assisted cell-selection technique according to the subject matter disclosed herein. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on-board memory, such as cache memory, and further may be coupled to external memory devices such as synchronous dynamic random access memory (SDRAM) 814 for storing and/or executing applications, such as capable of providing a positioning-assisted cell-selection technique according to the subject matter disclosed herein. During operation, and NAND flash 816 for storing applications and/or data even when information handling system 800 is powered off.

In one exemplary embodiment, a list of candidate nodes may be stored in SDRAM 814 and/or NAND flash 816. Further, applications processor 810 may execute computer-readable instructions stored in SDRAM 814 and/or NAND flash 816 that result in a positioning-assisted cell-selection technique according to the subject matter disclosed herein.

In one exemplary embodiment, baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example, for communicating via a 3GPP LTE network or the like as discussed herein with respect to FIG. 8. The WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832, for example, via a finger or a stylus. In one exemplary embodiment, screen 832 display a menu and/or options to a user that are selectable via a finger and/or a stylus for entering information into information-handling system 800.

An ambient light sensor 834 may be utilized to detect an amount of ambient light in which information-handling system 800 is operating, for example, to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may be coupled to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information-handling system via the audio ports 850, for example, via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
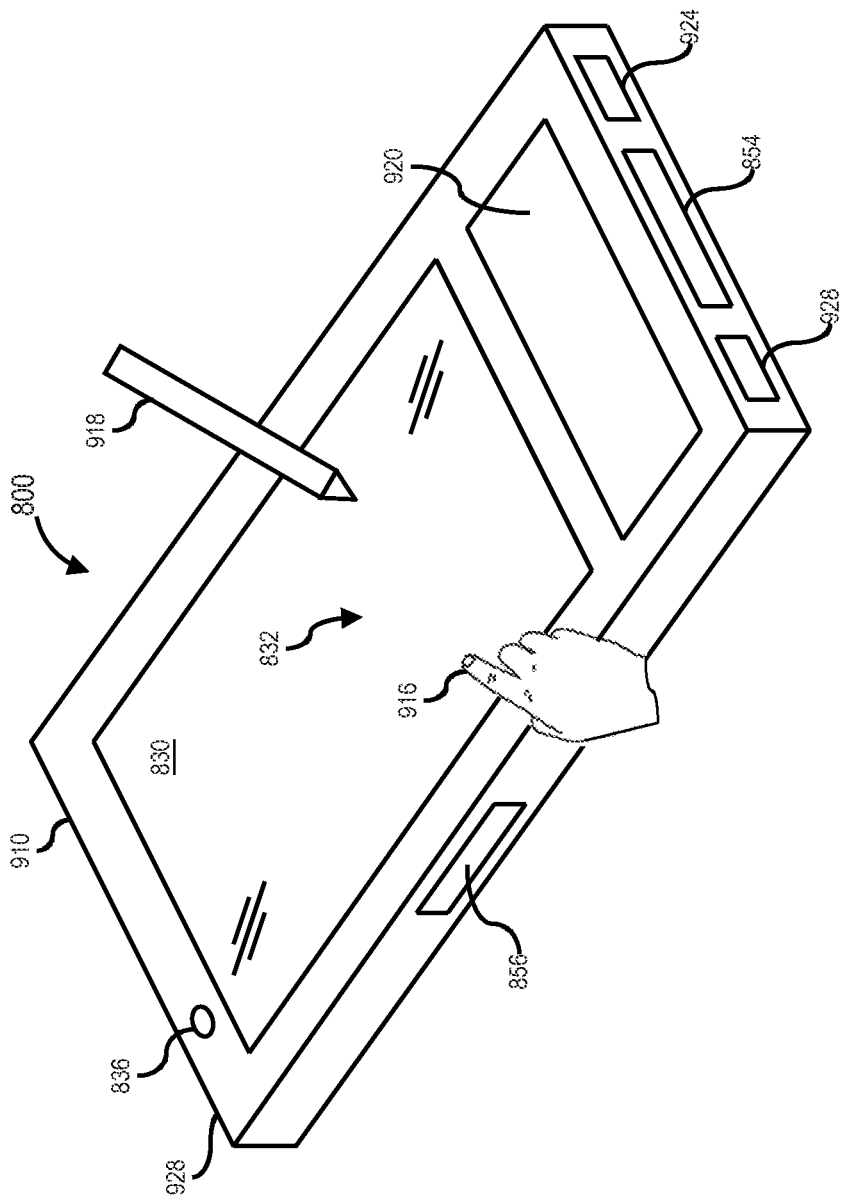
FIG. 9 depicts an isometric view of an exemplary embodiment of the information-handling system of FIG. 8 that optionally may include a touch screen in accordance with one or more embodiments disclosed herein.

FIG. 9 depicts an isometric view of an exemplary embodiment of the information-handling system of FIG. 8 that optionally may include a touch screen in accordance with one or more embodiments disclosed herein. FIG. 9 shows an example implementation of information-handling system 800 of FIG. 8 tangibly embodied as a cellular telephone, smartphone, smart-type device, or tablet-type device or the like, that is capable of providing a positioning-assisted cell-selection technique according to the subject matter disclosed herein. In one or more embodiments, the information-handling system 800 may comprise any one of the infrastructure nodes, wireless device 200, subscriber station 416, CPE 422, mobile station UE 511 of FIG. 5, and/or an M2M-type device, although the scope of the claimed subject matter is not limited in this respect. The information-handling system 800 may comprise a housing 910 having a display 830 that may include a touch screen 832 for receiving tactile input control and commands via a finger 916 of a user and/or a via stylus 918 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 which may comprise a keyboard or buttons for controlling information-handling system via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 836 on one or more sides of the housing 910. It should be noted that the information-handling system 800 of FIGS. 8 and 9 may include more or fewer elements than shown, in various arrangements, and the scope of the claimed subject matter is not limited in this respect.

Figure 10:
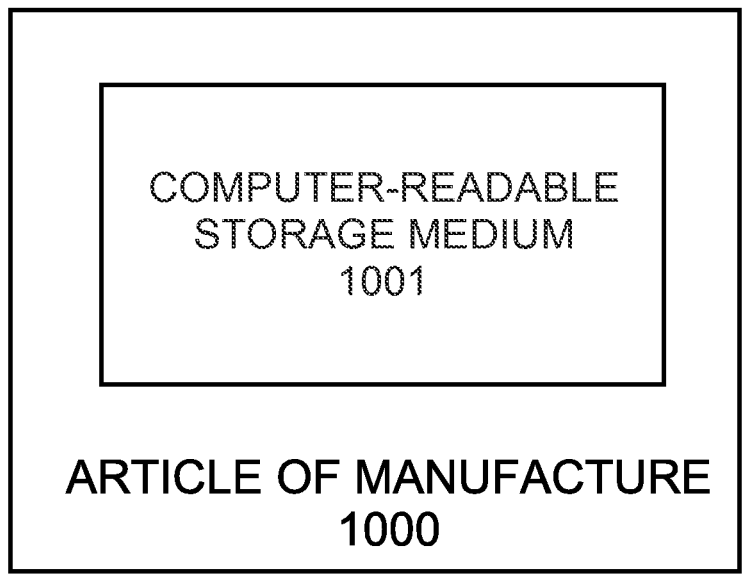
FIG. 10 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 10 depicts an exemplary embodiment of an article of manufacture 1000 comprising a non-transitory computer-readable storage medium 1001 having stored thereon computer-readable instructions that, when executed by a computer-type device, results in any of the various techniques and methods according to the subject matter disclosed herein. Exemplary computer-readable storage mediums that could be used for computer-readable storage medium 1001 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless device, comprising:
a receiver capable of receiving one or more signals from one or more first nodes of a wireless network, the received one or more signals comprising information relating to a location of the wireless device within the wireless network; and
a transmitter capable of transmitting a signal to one or more second nodes of the wireless network, the transmitted signal containing information relating to the location of the wireless device within the wireless network;
the receiver further capable of receiving a signal from one or more third nodes comprising a list of candidate nodes in the wireless network to which the wireless device can connect, the list of candidate nodes being based on the information contained in the transmitted signal relating to the location of the wireless device within the wireless network, and the list of candidate nodes not including nodes to which the wireless device cannot connect and are in the vicinity of the wireless device.

2. The wireless device according to claim 1, further comprising a processor coupled to the receiver and capable of selecting a node from the list of candidate nodes to which the wireless device can connect.

3. The wireless device according to claim 2, wherein the node selected by the processor is for a cell re-selection connection for the wireless device.

4. The wireless device according to claim 1, wherein the received one or more signals comprise reference signal transmitted by the one or more first nodes of the wireless network.

5. The wireless device according to claim 1, wherein the received signal comprising information relating to a location of the wireless device is a downlink signal transmitted by the one or more first nodes of the wireless network.

6. The wireless device according to claim 1, wherein the list of candidate nodes comprises a list of only macro cell nodes in the wireless network.

7. The wireless device according to claim 1, wherein the list of candidate nodes comprises a list of macro cell nodes, low-power cell nodes, or a combination thereof.

8. The wireless device according to claim 1, wherein the receiver is further capable of receiving a signal containing global-positioning information for the wireless device, and
wherein the transmitted signal contains global-positioning information for the wireless device.

9. The wireless device according to claim 1, wherein the wireless network comprises an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a 3GPP LTE-Advanced-based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, or combinations thereof.

10. The wireless device according to claim 1, further comprising a touchscreen display capable of receiving input information from a touch of a user or a stylus.

11. A wireless device, comprising:
a transmitter capable of transmitting a signal to one or more first nodes of a wireless network, the transmitted signal containing information from which a location can be determined for the wireless device within the wireless network; and
a receiver capable of receiving a signal from the one or more second nodes comprising a list of candidate nodes in the wireless network to which the wireless device can connect, the list of candidate nodes being based on the determined location for the wireless device within the wireless network, and the list of candidate nodes not including nodes to which the wireless device cannot connect and are in the vicinity of the wireless device.

12. The wireless device according to claim 11, further comprising a processor coupled to the receiver and capable of selecting a node from the list of candidate nodes to which the wireless device can connect.

13. The wireless device according to claim 12, wherein the node selected by the processor is for a cell re-selection connection for the wireless device.

14. The wireless device according to claim 11, wherein the list of candidate nodes comprises a list of only macro cell nodes in the wireless network.

15. The wireless device according to claim 11, wherein the list of candidate nodes comprises a list of macro cell nodes, low-power cell nodes, or a combination thereof.

16. The wireless device according to claim 11, wherein the receiver is further capable of receiving a signal containing global-positioning information for the wireless device, and
wherein the transmitted signal contains global-positioning information for the wireless device.

17. The wireless device according to claim 11, wherein the wireless network comprises an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a 3GPP LTE-Advanced-based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, or combinations thereof.

18. The wireless device according to claim 11, further comprising a touchscreen display capable of receiving input information from a touch of a user or a stylus.

19. An entity in a communication network, comprising:
an interface capable of receiving location information for a wireless device coupled to the communication network;
a location determiner capable of determining a location of the wireless device based on the received location information; and
a cell-selection processor capable of determining a candidate list of nodes to which the wireless device can connect based on the determined location of the wireless device, the list of candidate nodes comprising fewer members than all possible nodes to which the wireless device could connect, and the list of candidate nodes not including nodes to which the wireless device cannot connect and are in the vicinity of the wireless device.

20. The entity according to claim 19, wherein the received location information is derived from downlink signals received by the wireless device from one or more nodes of the communication network.

21. The entity according to claim 19, wherein the received location information is derived from one or more reference signals received by the wireless device.

22. The entity according to claim 19, wherein the received location information is derived from uplink signals transmitted by the wireless device to at least one node of the communication network.

23. The entity according to claim 19, wherein the list of candidate nodes comprises a list of only macro cell nodes in the communication network.

24. The entity according to claim 19, wherein the list of candidate nodes comprises a list of macro cell nodes, low-power cell nodes, or a combination thereof.

25. The entity according to claim 19, wherein the received location information comprises global-positioning information for the wireless device.

26. The entity according to claim 19, wherein the communication network comprises an IEEE 802.11-based network, an IEEE 802.16-based network, an IEEE 802.18-based wireless network, a 3GPP-based protocol wireless network, a Third Generation Partnership Project Long Term Evolution (3GPP LTE) based wireless network, a 3GPP2 Air Interface Evolution (3GPP2 AIE) based wireless network, a 3GPP LTE-Advanced-based wireless network, a UMTS-based protocol wireless, a CDMA2000-based protocol wireless, a GSM-based protocol wireless, a cellular-digital-packet-data-based (CDPD-based) protocol wireless network, a Mobitex-based protocol wireless network, or combinations thereof.

* * * * *